(12) United States Patent
Chattopadhyay et al.

(10) Patent No.: US 11,424,902 B2
(45) Date of Patent: Aug. 23, 2022

(54) SYSTEM AND METHOD FOR SYNCHRONIZING NODES IN A NETWORK DEVICE

(71) Applicant: Microchip Technology Inc., Chandler, AZ (US)

(72) Inventors: Atanu Chattopadhyay, Pointe-Claire (CA); Andras de Koos, Montreal (CA)

(73) Assignee: Microchip Technology Inc., Chandler, AZ (US)

( * ) Notice: Subject to any disclaimer, the term of this patent is extended or adjusted under 35 U.S.C. 154(b) by 0 days.

(21) Appl. No.: 17/242,493

(22) Filed: Apr. 28, 2021

(65) Prior Publication Data
US 2022/0029778 A1    Jan. 27, 2022

Related U.S. Application Data

(60) Provisional application No. 63/055,228, filed on Jul. 22, 2020.

(51) Int. Cl.
*H04L 7/00* (2006.01)
*H04L 43/0864* (2022.01)

(52) U.S. Cl.
CPC ........ *H04L 7/0033* (2013.01); *H04L 43/0864* (2013.01)

(58) Field of Classification Search
CPC .. H04L 7/0033; H04L 43/0864; H04J 3/0638; H03K 5/135
USPC .................................. 375/356, 354, 371, 373
See application file for complete search history.

(56) References Cited

U.S. PATENT DOCUMENTS

| | | | |
|---|---|---|---|
| 5,343,482 A | 8/1994 | Penner et al. | |
| 5,361,277 A * | 11/1994 | Grover | H03K 5/135 |
| | | | 327/141 |
| 5,371,765 A | 12/1994 | Guilford | |
| 5,600,824 A | 2/1997 | Williams et al. | |
| 5,640,398 A | 6/1997 | Carr et al. | |
| 5,838,512 A | 11/1998 | Okazaki | |
| 5,850,422 A | 12/1998 | Chen | |
| 5,905,766 A | 5/1999 | Nguyen | |
| 6,044,122 A | 3/2000 | Ellersick et al. | |

(Continued)

FOREIGN PATENT DOCUMENTS

| | | |
|---|---|---|
| DE | 102017222442 A1 | 6/2019 |
| WO | 2003039061 A3 | 10/2003 |

OTHER PUBLICATIONS

U.S. Appl. No. 16/563,339, filed Sep. 6, 2019, Qu Gary Jin.

(Continued)

*Primary Examiner* — Phuong Phu
(74) *Attorney, Agent, or Firm* — Glass and Associates; Kenneth Glass; Molly Sauter

(57) ABSTRACT

System and method for synchronizing a plurality of nodes to a timing signal using a daisy-chain network having a forward transmission path and a reverse transmission path connected at a midpoint. Latency of the timing signal to the midpoint of the daisy-chain network is determined, a respective latency of the timing signal from the node to the midpoint of the daisy-chain network is determined, and a respective timing offset for each of the plurality of nodes is calculated. A local time-of-day counter at each of the plurality of nodes is adjusted based upon the respective timing offset of the node to synchronize the plurality of nodes to the timing signal.

18 Claims, 6 Drawing Sheets

(56) References Cited

U.S. PATENT DOCUMENTS

| | | |
|---|---|---|
| 6,052,073 A | 4/2000 | Carr et al. |
| 6,138,061 A | 10/2000 | McEnnan et al. |
| 6,150,965 A | 11/2000 | Carr et al. |
| 6,188,699 B1 | 2/2001 | Lang et al. |
| 6,333,935 B1 | 12/2001 | Carr et al. |
| 6,345,052 B1 | 2/2002 | Tse et al. |
| 6,359,479 B1 | 3/2002 | Oprescu |
| 6,584,521 B1 | 6/2003 | Dillabough et al. |
| 6,603,776 B1 | 8/2003 | Fedders et al. |
| 6,668,297 B1 | 12/2003 | Karr et al. |
| 6,671,758 B1 | 12/2003 | Cam et al. |
| 6,744,787 B1 | 6/2004 | Schatz et al. |
| 6,820,159 B2 | 11/2004 | Mok et al. |
| 6,823,001 B1 | 11/2004 | Chea |
| 6,870,831 B2 | 3/2005 | Hughes et al. |
| 7,117,112 B2 | 10/2006 | Mok |
| 7,161,999 B2 | 1/2007 | Parikh |
| 7,165,003 B2 | 1/2007 | Mok |
| 7,187,741 B2 | 3/2007 | Pontius et al. |
| 7,203,616 B2 | 4/2007 | Mok |
| 7,239,650 B2 | 7/2007 | Rakib et al. |
| 7,239,669 B2 | 7/2007 | Cummings et al. |
| 7,295,945 B2 | 11/2007 | Mok |
| 7,388,160 B2 | 6/2008 | Mok et al. |
| 7,417,985 B1 | 8/2008 | McCrosky et al. |
| 7,468,974 B1 | 12/2008 | Carr et al. |
| 7,492,760 B1 | 2/2009 | Plante et al. |
| 7,593,411 B2 | 9/2009 | McCrosky et al. |
| 7,656,791 B1 | 2/2010 | Mok et al. |
| 7,668,210 B1 | 2/2010 | Mok et al. |
| 7,751,411 B2 | 7/2010 | Cam et al. |
| 7,772,898 B2 | 8/2010 | Cheung |
| 7,807,933 B2 | 10/2010 | Mok et al. |
| 8,010,355 B2 | 8/2011 | Rahbar |
| 8,023,641 B2 | 9/2011 | Rahbar |
| 8,085,764 B1 | 12/2011 | McCrosky et al. |
| 8,243,759 B2 | 8/2012 | Rahbar |
| 8,335,319 B2 | 12/2012 | Rahbar |
| 8,413,006 B1 | 4/2013 | Mok et al. |
| 8,428,203 B1 | 4/2013 | Zortea et al. |
| 8,483,244 B2 | 7/2013 | Rahbar |
| 8,542,708 B1 | 9/2013 | Mok et al. |
| 8,599,986 B2 | 12/2013 | Rahbar |
| 8,774,227 B2 | 7/2014 | Rahbar |
| 8,854,963 B1 | 10/2014 | Muma et al. |
| 8,913,688 B1 | 12/2014 | Jenkins |
| 8,957,711 B2 | 2/2015 | Jin et al. |
| 8,971,548 B2 | 3/2015 | Rahbar et al. |
| 8,976,816 B1 | 3/2015 | Mok et al. |
| 8,989,222 B1 | 3/2015 | Mok et al. |
| 9,019,997 B1 | 4/2015 | Mok et al. |
| 9,025,594 B1 | 5/2015 | Mok et al. |
| 9,209,965 B2 | 12/2015 | Rahbar et al. |
| 9,276,874 B1 | 3/2016 | Mok et al. |
| 9,313,563 B1 | 4/2016 | Mok et al. |
| 9,374,265 B1 | 6/2016 | Mok et al. |
| 9,444,474 B2 | 9/2016 | Rahbar et al. |
| 9,473,261 B1 | 10/2016 | Tse et al. |
| 9,503,254 B2 | 11/2016 | Rahbar et al. |
| 9,525,482 B1 | 12/2016 | Tse |
| 10,069,503 B2 | 9/2018 | Zhang et al. |
| 10,079,651 B2 | 9/2018 | Ramachandra |
| 10,104,047 B2 | 10/2018 | Muma et al. |
| 10,128,826 B2 | 11/2018 | Jin et al. |
| 10,250,379 B2 | 4/2019 | Haddad et al. |
| 10,432,553 B2 | 10/2019 | Tse |
| 10,608,647 B1 | 3/2020 | Ranganathan et al. |
| 10,715,307 B1 | 7/2020 | Jin |
| 2001/0056512 A1 | 12/2001 | Mok et al. |
| 2005/0110524 A1 | 5/2005 | Glasser |
| 2006/0056560 A1 | 3/2006 | Aweya et al. |
| 2006/0076988 A1 | 4/2006 | Kessels et al. |
| 2007/0036173 A1 | 2/2007 | McCrosky et al. |
| 2007/0064834 A1 | 3/2007 | Yoshizawa |
| 2007/0132259 A1 | 6/2007 | Ivannikov et al. |
| 2008/0000176 A1 | 1/2008 | Mandelzys et al. |
| 2008/0202805 A1 | 8/2008 | Mok et al. |
| 2010/0052797 A1 | 3/2010 | Carley et al. |
| 2011/0095830 A1 | 4/2011 | Tsangaropoulos et al. |
| 2012/0158990 A1 | 6/2012 | Losio et al. |
| 2014/0055179 A1 | 2/2014 | Gong et al. |
| 2014/0139275 A1 | 5/2014 | Dally et al. |
| 2016/0277030 A1 | 9/2016 | Burbano et al. |
| 2016/0301669 A1 | 10/2016 | Muma et al. |
| 2017/0244648 A1 | 8/2017 | Tse |
| 2018/0131378 A1 | 5/2018 | Haroun et al. |
| 2018/0159541 A1 | 6/2018 | Spijker |
| 2020/0166912 A1* | 5/2020 | Schneider ............ H04J 3/0638 |

OTHER PUBLICATIONS

U.S. Appl. No. 16/795,520, filed Feb. 19, 2020, Peter Meyer.
PCT/US2021/030165, International Search Report and Written Opinion, European Patent Office, dated May 8, 2021.

* cited by examiner

SYSTEM AND METHOD FOR SYNCHRONIZING NODES IN A NETWORK DEVICE

CROSS-REFERENCE TO RELATED APPLICATIONS

The present application claims priority to U.S. Provisional Patent Application Ser. No. 63/055,228 filed on Jul. 22, 2020, the contents of which are incorporated by reference herein in their entirety.

BACKGROUND

Timing and synchronization are vital to the increasingly digital, networked world. Precise and accurate timing is critical for data centers, wired and wireless communications, financial exchanges, industrial networks, smart power grids and various other secure communication systems. Precise and accurate timing often requires the synchronization of various nodes within a system. The nodes requiring synchronization may be multiple devices connected over a network or multiple nodes requiring synchronization may be included in a single device connected over the network. Since each of these nodes may run on a different time-of-day (ToD) clock and may be positioned in separate regions of the system, achieving sub-nanosecond precision in these nodes in non-trivial.

To accomplish timing synchronization of endpoints devices, a timing master often transmits a timing pulse, indicating a pre-determined time to the nodes. However, the timing pulse experiences a propagation delay as it travels through the timing master's output pins, on the printed circuit board traces, through the nodes input pins and inside the node, as well. The propagation delay of the timing pulse to each of the ToD counters on the node is even more complicated, because gate latencies are subject to process/voltage/temperature (PVT) variations. For nodes which are a component of a large device, having long on-chip routes and numerous buffers along the way, the latency can vary by more than 5-10 ns, which can be larger than the precision that the timing synchronization is attempting to achieve. Correcting for PVT variations of a node is not easy, since any advance prediction of latency as a function of voltage and temperature can change over time. Additionally, PVT variations are not guaranteed to be consistent within a single node or between nodes.

Accordingly, what is needed in the art is an improved system and method for synchronizing nodes to a reference timing signal in a network device.

SUMMARY OF THE INVENTION

In various embodiments, the present invention provides a system and method for synchronizing a plurality of nodes to a timing signal utilizing a daisy-chain network to distribute the timing signal to the plurality of nodes.

In accordance with one exemplary embodiment of the present invention, a technique for synchronizing multiple nodes to a common reference signal includes using a single dual-conductor daisy-chained timing signal that sequentially connects all nodes, where the timing reference signal is looped back at the end of the daisy-chain and routed back through all nodes, thereby providing each node with a pair of timing samples. The method and apparatus of the present invention is easy to implement and is applicable to a broad range of applications. Co-locating the timing signal with the nodes simplifies delay-balancing and ensures tolerance to PVT variation. The method and apparatus of the present invention is applicable on a die, on a board or in a system where path latency is non-negligible when compared to required timing precision. Moreover, the timing signal can be used to start an application simultaneously, such as telling multiple nodes to start the application upon receipt of the timing signal. Alternatively, the timing signal can broadcast a time-of-day (ToD) to synchronize multiple nodes.

In one embodiment, a method is provided for synchronizing a plurality of nodes to a timing signal. The method includes, receiving a timing signal at a top-level measurement circuit and receiving the timing signal at a plurality of nodes, wherein each of the plurality of nodes are connected by a daisy-chain network comprising a forward transmission path and a reverse transmission path connected at a midpoint. The method further includes, determining, at the top-level measurement circuit, a total round-trip delay of the timing signal over the daisy-chain network, estimating, at the top-level measurement circuit, a latency of the timing signal to the midpoint of the daisy-chain network as one half of the total round-trip delay and determining, at each of the plurality of nodes, a respective round-trip delay of the timing signal over the daisy-chain network. The method additional includes, estimating, for each of the plurality of nodes, a respective latency of the timing signal from the node to the midpoint of the daisy-chain network as one half of the respective round-trip delay, calculating a respective timing offset for each of the plurality of nodes, wherein the respective timing offset is equal to a difference between the latency of the timing signal to the midpoint of the daisy-chain network and the respective latency of the timing signal from the node to the midpoint of the daisy-chain network and adjusting a local time-of-day counter at each of the plurality of nodes based upon the respective timing offset of the node to synchronize the plurality of nodes to the timing signal.

In an additional embodiment, a system is provided for synchronizing a plurality of nodes to a timing signal. The system includes, a plurality of nodes, each of the plurality of node comprising a respective measurement circuit, a daisy-chain network connecting each of the plurality of nodes, the daisy-chain network comprising a forward transmission path and a reverse transmission path connected at a midpoint and a top-level measurement circuit for receiving a timing signal transmitted over the forward transmission path, for receiving the timing signal over the reverse transmission path of the daisy-chain network, for determining a total round-trip delay of the timing signal over the daisy-chain network and for estimating a latency of the timing signal from the top-level measurement circuit to the midpoint of the daisy-chain network as one half of the total round-trip delay. In this embodiment, the respective measurement circuit at each of the plurality of nodes is for receiving the timing signal transmitted over the forward transmission path and receiving the timing signal transmitted over the reverse transmission path of the daisy-chain network, determining a respective round-trip delay of the timing signal over the daisy-chain network, estimating a respective latency of the timing signal from the node to the midpoint of the daisy-chain network as one half of the respective round-trip delay, calculating a respective timing offset for each of the plurality of nodes, wherein the respective timing offset is equal to a difference between the estimated latency of the timing signal from the top-level measurement circuit to the midpoint of the daisy-chain network and the respective estimated latency of the timing signal from the node to the midpoint of the daisy-chain network and adjusting a local time-of-day counter at each of the plurality of nodes based upon the respective calculated timing offset of the node to synchronize the plurality of nodes to the timing signal.

Accordingly, these various embodiments provide an improved system and method for synchronizing nodes to a reference timing signal in a network device.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DETAILED DESCRIPTION OF THE INVENTION

Figure 1:
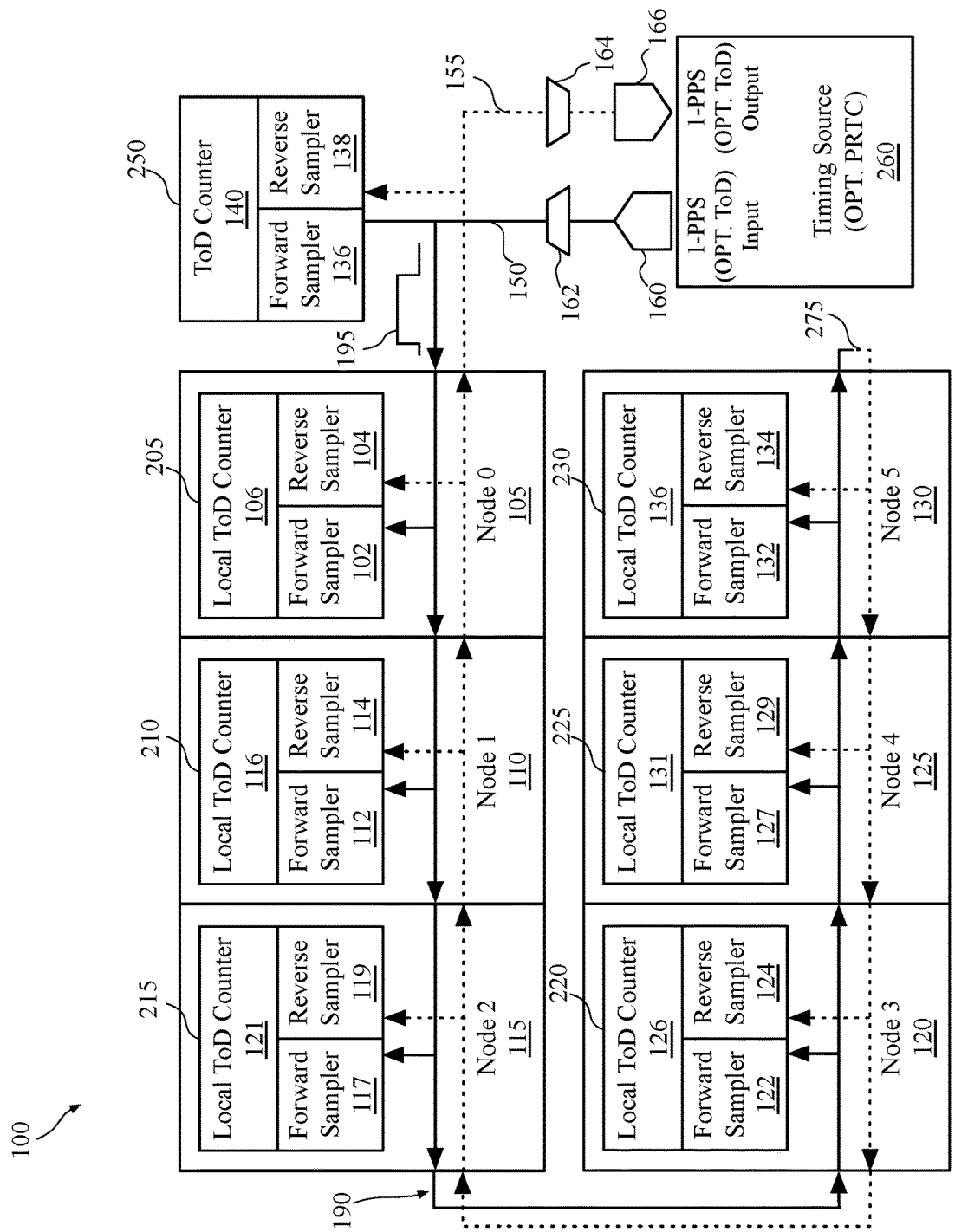
FIG. 1 is a block diagram illustrating a system for synchronization a plurality of nodes to a timing signal, in accordance with an embodiment of the present invention.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications, and equivalents, which may be included within the spirit and scope of the various embodiments as defined by the appended claims. Furthermore, in this Detailed Description of the Invention, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

It will be understood that, although the terms first, second, third, without limitation, may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The methods and systems of the present invention may be implemented in IEEE 1588 Precision Time Protocol (PTP) applications, where it is necessary to broadcast ToD information to a timestamp engine of multiple nodes with a known delay, regardless of any manufacturing and environmental variations present within the nodes. ToD information is generally broadcast utilizing a 1 Hz signal which indicates the seconds rollover of the network time. In various embodiments, the present examples offset the 1 Hz signal that is used by all the endpoints devices to minimize a sampling error with respect to the source of the 1 Hz signal.

For applications that require on-chip, multi-node synchronization, the problem of routing the timing signal is non-trivial. While all the paths for the timing signal may be balanced on a best-effort basis, this yields different skew and different latency depending upon the environment conditions and processes. For some applications, this level of uncertainty is acceptable, but in other cases, such as PTP timestamping of Ethernet packets, a more accurate method may be needed. For example, for PTP timestamping requiring synchronization to within +/− 10 ns, the sources of the timing uncertainty need to be minimized, including ToD distribution to the nodes of the network. In a typical timestamping application, there are two sources or error at each of the receive and transmit nodes. The first source of error is the local time at the node with respect to a master timing reference signal and the second source of error is the predictive logic used to generate the actual timestamp from the local time at the node. In various embodiments, the present examples address the first source of error by removing a significant portion of the on-chip time-of-day (ToD) and reference timing signal transmission uncertainty.

In various embodiments, the present examples utilize a daisy-chain network to route a synchronization signal, or timing signal, from a timing source, through each node, back through each node again in the opposite direction and then back to the timing source. By routing the timing through each of the nodes twice, once in the forward direction and one in the reverse direction, a pair of timing references (forward and reverse) are acquired by each node and each node is then able to estimate a latency of the timing signal from the respective node to a midpoint of the daisy-chain network.

With reference to FIG. 1, the present invention provides a system 100 for synchronizing a plurality of nodes to a timing signal. In this example, the system 100 includes 6 nodes 105, 110, 115, 120, 125, 130. However, this is not intended to be limiting and any number of nodes could be implemented in the system 100.

The system 100 of the present invention further includes a timing source 260, such as a Primary Reference Time Clock (PRTC), for generating a timing signal that is used to synchronize the plurality of nodes. In one further example, the timing signal is based on a highly accurate reference clock, such as a PRTC that is accurate to within 100*ns* of Universal Coordinated Time (UTC). The timing source 260 may provide timing signal(s) for determining time-of-day (ToD) at each of the plurality of nodes 105, 110, 115, 120, 125, 130 as a sequence of pulses having a repetition rate at one pulse per second (1-PPS), with each pulse accompanied by a time code that associates the pulse with a year, month, day, hour, minute and second, referenced to a standard, such as UTC. The timing source 260 couples the timing signal to the system 100 using an external input pad 160 and an external output pad 166 of the system 100. The system 100 may further include an input buffer 162 to buffer the timing signal arriving from the external input pad 160 for delivery to the system 100, and an output buffer 164 to buffer the timing signal received from the system 100 and destined for the external output pad 166.

As shown in FIG. 1, the system 100 includes a plurality of nodes 105, 110, 115, 120, 125, 130 connected over a daisy-chain network 190 which comprises a forward transmission path 150 and a reverse transmission path 155 connected at a midpoint 275. The timing signal 195 provided by the timing source 260 that is used to synchronize the nodes 105, 110, 115, 120, 125, 130 travels over the forward transmission path 150 through each of the plurality of nodes 105, 110, 115, 120, 125, 130. The timing signal 195 then reverses direction at the midpoint 275 and travels over the reverse transmission path 155 and back through each of the plurality of nodes 130, 125, 120, 115, 110, 105.

When routing the timing signal 195 to multiple nodes 105, 115, 115, 120, 125, 130 over the daisy-chain network 190, there is significant difficulty in obtaining a known delay to each of the multiple nodes 105, 115, 115, 120, 125, 130 from the source of the timing signal 195 because the physical routing of the wiring carrying the timing signal travels through different regions of each node that experience process, voltage and environmental/temperature (PVT) conditions which affect the delay of the timing signal between the timing source and each of the nodes. Additionally, the longer the physical wire between the timing source and the node, the more delay variation can be expected. To address the undesirable variation in PVT conditions in determining timing delays the forward transmission path 150 and the reverse transmission path 155 of the daisy-chain network 190 are co-located. Additionally, the daisy-chain network 190 is divided into segments between neighboring nodes that are delay-balanced to limit the delay variation within each segment and to create a scenario wherein each of the segments are exposed to the same PVT conditions, thereby further reducing the probability of delay mismatches. The neighboring nodes on the daisy-chain network 190 are connected by a forward transmission path segment and a reverse transmission path segment of the daisy-chain network 190, which form a segment pair of the daisy-chain network 190, each segment pair of the daisy-chain network 190 is laid out to be delay-balanced such that the propagation delay of the timing signal 195 between neighboring nodes is substantially equal over the forward transmission path 150 and the reverse transmission path 155, e.g. the forward transmission path 150 and the reverse transmission path 155 are co-located for each segment pair. In a particular example, a propagation delay of the timing signal 195 between node 105 and node 110 over the forward transmission path 150 is substantially equal to a propagation delay of the timing signal 195 between node 110 and node 105 over the reverse transmission path 155, and as such the segment pair between node 105 and node 110 is delay-balanced. It follows that each of the segment pairs of the daisy-chain network 190 between neighboring nodes is delay-balanced.

As will be described in more detail below, provided that each segment pair of the daisy-chain network 190 is delay-balanced, a common reference time of half the total round-trip delay of the timing signal 195 over the daisy-chain network 190 can be used to synchronize each of the nodes 105, 110, 115, 120, 125, 130 to the timing signal 195.

Additionally, while each of the segment pairs of the daisy-chain are delay-balanced, it is not necessary that the propagation delay of any of the segment pairs between nodes be matched. For example, it is not required that the propagation delay between node 105 and node 110 be equal to the propagation delay between node 125 and node 130.

In the present examples, each of the plurality of nodes 105, 110, 115, 120, 125, 130 comprises a respective measurement circuit 205, 210, 215, 220, 225, 230. Each of the respective measurement circuits 205, 210, 215, 220, 225, 230 includes a forward sampler, a reverse sampler and a local ToD counter. As such, measurement circuit 205 of node 105 includes a forward sampler 102, a reverse sampler 104 and a local ToD counter 106, measurement circuit 210 of node 110 includes a forward sampler 112, a reverse sampler 114 and a local ToD counter 116, measurement circuit 215 of node 115 includes a forward sampler 117, a reverse sampler 119 and a local ToD counter 121, measurement circuit 220 of node 120 includes a forward sampler 122, a reverse sampler 124 and a local ToD counter 126, measurement circuit 225 of node 125 includes a forward sampler 127, a reverse sampler 129 and a local ToD counter 131 and measurement circuit 230 of node 130 includes a forward sampler 132, a reverse sampler 134 and a local ToD counter 136.

Each of the forward samplers 102, 112, 117, 122, 127, 132 comprise circuitry arranged to sample the respective local ToD counter 106, 116, 121, 126, 131, 136 in response to receiving a timing signal 195 transmitted over the forward transmission path 150 and each of the reverse samplers 104, 114, 119, 124, 129, 134 comprise circuitry arranged to sample the respective local ToD counter 106, 116, 121, 126, 131, 136 in response to receiving a timing signal 195 transmitted over the reverse transmission path 155. While this embodiment describes and illustrates the forward samplers 102, 112, 117, 122, 127, 132 and the reverse samplers 104, 114, 119, 124, 129, 134 of respective nodes 105, 110, 115, 120, 125, 130 as being separate and distinct, this is not intended to be limiting and the forward and reverse samplers could share one or more circuits for sampling the respective local ToD counter 106, 116, 121, 126, 131, 126.

The system 100 further includes a top-level measurement circuit 250 for receiving the timing signal 195 provided by the timing source 260 and transmitted over the forward transmission path 150 and over the reverse transmission path 155 of the daisy-chain network 190. The top-level measurement circuit 250 comprises a forward sampler 136, a reverse sampler 138 and a top-level ToD counter 140. The forward sampler 136 of the top-level measurement circuit 250 includes circuitry arranged to sample the top-level ToD counter 140 in response to receiving the timing signal 195 over the forward transmission path 150 and the reverse sampler 138 of the top-level measurement circuit 250 includes circuitry arranged to sample the top-level ToD counter 140 in response to receiving the timing signal 195 over the reverse transmission path 155. While this embodiment describes and illustrates the forward sampler 136 and the reverse sampler 138 of top-level measurement circuit 250 as being separate and distinct, this is not intended to be limiting and the forward and reverse samplers could share one or more circuits for sampling the top-level ToD counter 140.

The system 100 of the present example implements daisy-chained signaling of a 1-PPS input timing signal 195 that loops from the external input pad 160 in a forward transmission path 150 sequentially to each node 105, 110, 115, 120, 125, 130 and then back in a reverse transmission path 155, co-located with the forward path 150, through each node 105, 110, 115, 120, 125, 130. As will be described in further detail, the daisy-chain implementation utilizes two sets of samples such that the forward and reverse signals are both timestamped at each node using the respective local time-of-day (ToD) counter. Provided that each segment of the forward transmission path 150 and the reverse transmission path 155 between neighboring nodes is delay-balanced, setting the local time of each of the nodes 105, 110, 115, 120, 125, 130 to the midpoint of the forward and reverse timestamp provides a common reference time of half the total round-trip delay, equivalent to the 1-PPS arrival time at the midpoint 275 in the daisy-chain network 190.

In operation of the system 100 of the present invention, a timing signal 195 from the timing source 260 is transmitted to the top-level measurement circuit 250 and to the plurality of nodes 105, 110, 115, 120, 125, 130, wherein each of the plurality of nodes 105, 110, 115, 120, 125, 130 are connected by a daisy-chain network 190 comprising a forward transmission path 150 and a reverse transmission path 155 connected at a midpoint 275. The top-level measurement circuit 250 is used to estimate a latency of the timing signal 195 to the midpoint 275 of the daisy-chain network 190 determined as ½ the total round-trip delay of the timing signal 195. Each of the respective measurement circuits 205, 210, 215, 220, 225, 230 of the nodes 105, 110, 115, 120, 125, 130 are used to estimate a latency of the timing signal 195 from the respective node to the midpoint 275 of the daisy-chain network 190 determined as ½ the round-trip delay of the timing signal 195 at the reference node. Each of the nodes 105, 110, 115, 120, 125, 130 then calculates a respective timing offset that is equal to a difference between the latency of the timing signal 195 from the top-level measurement circuit 250 to the midpoint 275 of the daisy-chain network 190 and the respective latency of the timing signal 195 from the node 105, 110, 115, 120, 125, 130 to the midpoint 275 of the daisy-chain network 190. The respective timing offset that is calculated at each of the nodes 105, 110, 115, 120, 125, 130 is then used to adjust the respective local ToD counter 106, 116, 121, 126, 131, 136 at each of the nodes 105, 110, 115, 120, 125, 130 to synchronize the plurality of nodes 105, 110, 115, 120, 125, 130 to the timing signal 195.

As described, the top-level measurement circuit 250 is used to estimate a latency of the timing signal 195 to the midpoint 275 of the daisy-chain network 190. In particular, the top-level measurement circuit 250 determines a total round-trip delay of the timing signal 195 over the daisy-chain network 190 by sampling the top-level ToD counter 140 upon the arrival of the timing signal 195 over the forward transmission path 150 using the forward sampler 136 and sampling the top-level ToD counter 140 upon the arrival of the timing signal 195 over the reverse transmission path 155 using the reverse sampler 138. The round-trip delay of the timing signal 195 over the daisy-chain network 190 is then calculated as the differences between the ToD sampled by the forward sampler 136 and the ToD sampled by the reverse sampler 138. In a particular embodiment, the top-level ToD counter 140 is sampled by the forward sampler 136 on a rising edge of the timing signal 195 received over the forward transmission path 150 to generate a first top-level timestamp and the top-level ToD counter 140 is sampled on the rising edge of the timing signal 195 received over the reverse transmission path 155 to generate a second top-level timestamp and the difference between the first top-level timestamp and the second top-level timestamp is calculated to determine the total round-trip delay of the timing signal over the daisy-chain network 190. The latency of the timing signal 195 to the midpoint 275 of the daisy-chain network 190 is then estimated to be one half of the calculated round-trip delay of the timing signal 195 over the daisy-chain network 190. While the above has been described as being sampled on the rising edge, it is to be understood that the falling edge may be used in place of the rising edge, without exceeding the scope.

Additionally, as described, each of the respective measurement circuits 205, 210, 215, 220, 225, 230 of the nodes 105, 110, 115, 120, 125, 130 are used to estimate a latency of the timing signal 195 from the respective node to the midpoint 275 of the daisy-chain network 190. For example, measurement circuit 205 estimates a latency of the timing signal 195 from node 105 to the midpoint 275 of the daisy-chain network, measurement circuit 210 estimates a latency of the timing signal 195 from node 110 to the midpoint 275 of the daisy-chain network, measurement circuit 215 estimates a latency of the timing signal 195 from node 115 to the midpoint 275 of the daisy-chain network, measurement circuit 220 estimates a latency of the timing signal 195 from node 120 to the midpoint 275 of the daisy-chain network, measurement circuit 225 estimates a latency of the timing signal 195 from node 125 to the midpoint 275 of the daisy-chain network and measurement circuit 230 estimates a latency of the timing signal 195 from node 130 to the midpoint 275 of the daisy-chain network.

In particular, the respective measurement circuit 205, 210, 215, 220, 225, 130 at each of the plurality of nodes 105, 110, 115, 120, 125, 130 receives the timing signal 195 transmitted over the forward transmission path 150 and receives the timing signal 195 transmitted over the reverse transmission path 155 of the daisy-chain network 190. Each of the respective measurement circuits 205, 210, 215, 220, 225, 230 then estimates a respective latency of the timing signal 195 from the node 105, 110, 115, 120, 125, 130 to the midpoint 275 of the daisy-chain network 190. To estimate the respective latency of the timing signal 195 from the node 105, 110, 115, 120, 125, 130 the respective forward sampler 102, 112, 117, 122, 127, 132 of the respective measurement circuit 205, 210, 215, 220, 225, 230 of the respective node 105, 110, 115, 120, 125, 130 samples the respective local ToD counter 106, 116, 121, 126, 131, 136 on an edge of the timing signal 195 received over the forward transmission path 150 to generate a first local timestamp and the reverse sampler 104, 114, 119, 124, 129, 134 of the respective measurement circuit 205, 210, 215, 220, 225, 230 samples the respective ToD counter 106, 116, 121, 126, 131, 136 on the edge of the timing signal 195 received over the reverse transmission path 155 to generate a second local timestamp at each of the nodes 105, 110, 115, 120, 125, 130. As indicated above, either the rising or the falling edge may be used. The respective node 105, 110, 115, 120, 125, 130 then calculates the difference between the first local timestamp and the second local timestamp to determine the respective node round-trip delay of the timing signal 195 over the daisy-chain network 190. Each of the plurality nodes 105, 110, 115, 120, 125, 130 then divides the respective node round-trip delay by half to estimate the respective latency of the timing signal 195 from each of the plurality of nodes to the midpoint 275 of the daisy-chain network 190. As previously described, the node then uses the respective latency of the timing signal 195 from each of the plurality of nodes to the midpoint 275 of the daisy-chain network 190 to calculate a respective timing offset that is equal to a difference between the latency of the timing signal 195 from the top-level measurement circuit 250 to the midpoint 275 of the daisy-chain network 190 and the respective latency of the timing signal 195 from the node 105, 110, 115, 120, 125, 130 to the midpoint 275 of the daisy-chain network 190. The respective timing offset that is calculated at each of the nodes 105, 110, 115, 120, 125, 130 is then used to adjust the respective local ToD counter 106, 116, 121, 126, 131, 136 at each of the nodes 105, 110, 115, 120, 125, 130 to synchronize the plurality of nodes 105, 110, 115, 120, 125, 130 to the timing signal 195.

In addition to adjusting the respective local ToD counter 106, 116, 121, 126, 131, 136 at each of the nodes 105, 110, 115, 120, 125, 130 based upon the respective timing offset, it may additionally be necessary to subtract a delay time between the arrival of the timing signal 195 at external input pin 160 and the sampling of the timing signal 195 at the top-level measurement circuit 250. Since this delay time is external to the daisy-chain network 190 it is not accounted for in the respective timing offset calculated for each node 105, 110, 115, 120, 125, 130. In certain embodiments it may be desirable to locate the top-level measurement circuit 250 as close to the timing source as possible to reduce this delay time. In one example, the expected latency between providing the timing signal 195 from the timing source at external input pin 160 and receiving the timing signal at the top-level measurement circuit 250 is known and may be subtracted from the respective timing offset to incorporate this delay into the synchronization of the nodes. In particular the expected latency between providing the timing signal 195 from the timing source at external input pin 160 and receiving the timing signal at the top-level measurement circuit 250 and may have been previously determined through the use of various combinations of measurement and design information.

Figure 2:
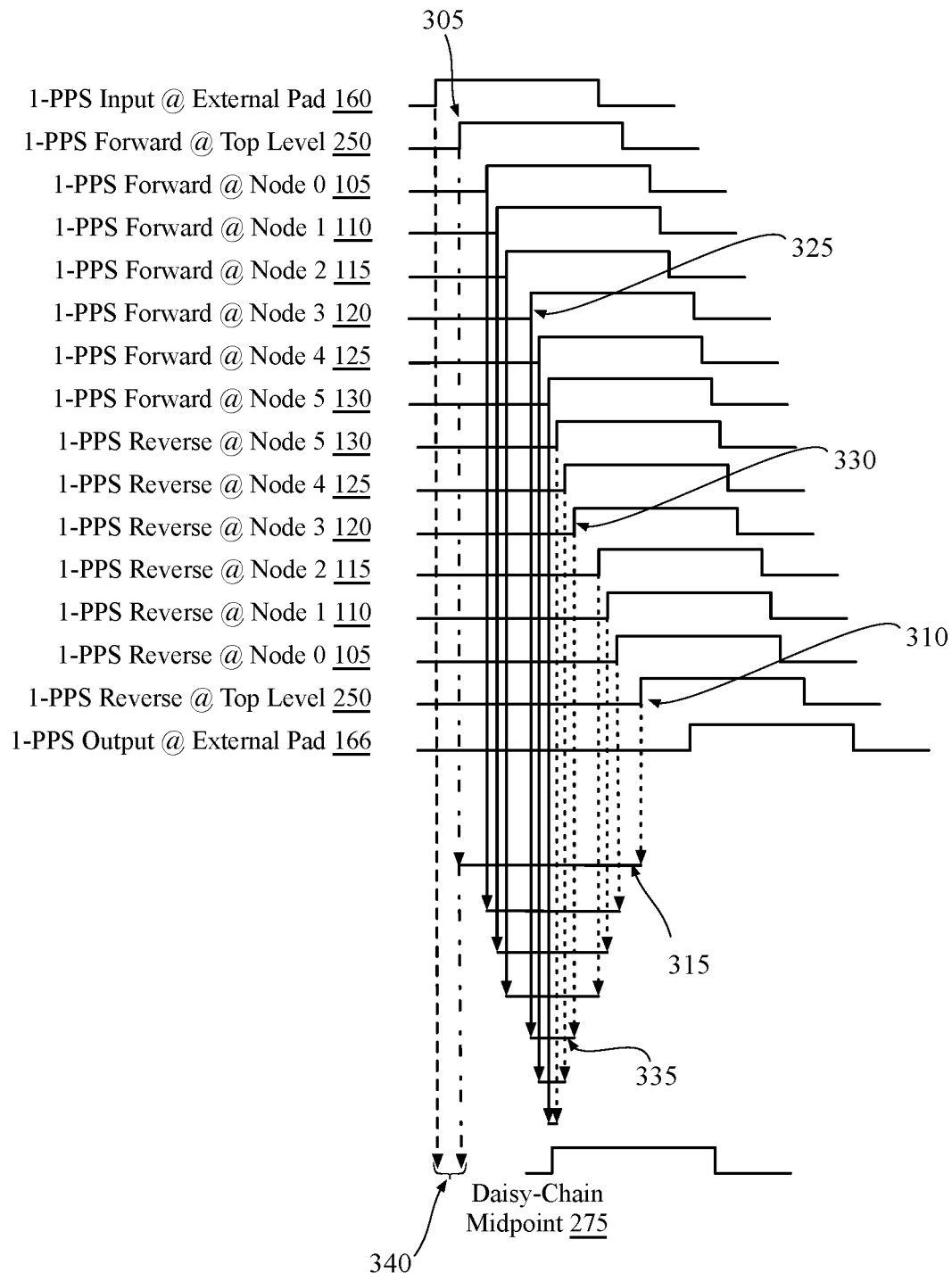
FIG. 2 illustrates the transmission of the timing signal over the daisy-chain network, in accordance with an embodiment of the present invention.

FIG. 2 illustrates an exemplary embodiment of the transmission of the timing signal 195 over the daisy-chain network 190, for a 1-PPS timing signal, which further demonstrates how the system 100 of the present invention synchronizes a plurality of nodes connected over a daisy-chain network to the timing signal 195.

With reference to FIG. 2, in an exemplary embodiment, the timing signal 195 arrives at the external input pad 160 and is then transmitted to the top-level measurement circuit 250 and through each of the nodes 105, 110, 115, 120, 125, 130 over the daisy-chain network over the forward transmission path 150. The timing signal 195 then reverses direction and travels back through each of the nodes 105, 110, 115, 120, 125, 130 over the reverse transmission path 155, to the top-level measurement circuit 250 and then to the external output pad 166.

To calculate a respective timing offset for each of the nodes 105, 110, 115, 120, 125, 130 that is used to synchronize each of the nodes 105, 110, 115, 120, 125, 130 to the timing signal 195, the forward sampler 136 of the top-level measurement circuit 250 samples the top-level ToD counter on a rising edge 305 of the timing signal 195 transmitted over the forward transmission path 150 to generate a first top-level timestamp and the reverse sampler 138 of the top-level measurement circuit 250 samples the top-level ToD counter on a rising edge 310 of timing signal 195 transmitted over the reverse transmission path 155 to generate a second top-level timestamp. The difference between first top-level timestamp and the second top-level timestamp can be considered the total round-trip latency for the timing signal 195, and total round-trip delay for the timing signal 195 is then divided in half to estimate the latency of the timing signal to the midpoint 275 of the daisy-chain network.

Additionally, a respective latency of the timing signal 195 from each node to the midpoint 275 of the daisy-chain network is estimated by sampling the local ToD counter on a rising edge of the timing signal in both the forward transmission path 150 and the reverse transmission path 155. For example, forward sampler 122 of node 120 samples the local ToD counter on a rising edge 325 of the timing signal 195 transmitted over the forward transmission path 150 to generate a first local timestamp and the reverse sampler 124 of the node 120 samples the local ToD counter of a rising edge 330 of the timing signal 195 transmitted over the reverse transmission path to generate a second local timestamp. The difference between the first local timestamp and the second local timestamp is then calculated and divided in half to estimate the respective latency for node 120 to the midpoint 275 of the daisy-chain network 190. The same process is followed for each of the other nodes 105, 110, 115, 120, 125, 130 to estimate the respective latency of the timing signal 195 from the respective endpoint to the midpoint 275 of the daisy-chain network.

As previously described, a respective timing offset is then calculated at each of the nodes 105, 110, 115, 120, 125, 130, wherein the respective timing offset is equal to the difference between the latency of the timing signal 195 to the midpoint 275 of the daisy-chain network and the respective latency of the timing signal 195 from the respective node to the midpoint 275 of the daisy-chain network. The respective timing offset of the node is then used to adjust the local ToD counter of the node to synchronize the node to the timing signal 195.

Additionally, if the expected latency 340 between when the timing signal 195 arrives at the external input pad 160 and when the timing signal 195 arrives at the top-level measurement circuit 250 is known, then this expected latency 340 may be subtracted from the respective timing offset to incorporate this delay into the synchronization of the nodes.

In various embodiments, a daisy-chain is used to route a 1-PPS timing signal from a timing source to each of a plurality of nodes and then to route the 1-PPS signal back through the plurality of nodes to the top-level measurement circuit 250. Instead of receiving a single timing reference, the system of the present invention receives a pair of references (forward and reverse) and estimates a respective latency of the timing signal 195 that is positioned at the midpoint of the forward and reverse transmission paths 150, 155. In a specific embodiment, the timing signal 195 may be connected back to the timing source 260 to assist in the estimation of the expected latency of the timing signal 195 from the timing source 260 to the top-level measurement circuit 250. The round-trip latency from the timing source 260 back to the timing source 260, which includes the forward delay from the external input pad 160 and the input buffer 162 and the reverse delay from the output buffer 164 and the external output pad 166 may be determined and compared with the round-trip latency for the timing signal 195 determined by top-level measurement circuit 250. The input delay to forward sampler 136 can then be estimated as a proportion of the measured the round-trip latency from the timing source 260 back to the timing source 260 minus the round-trip delay for the timing signal 195 determined by top-level measurement circuit 250. Once the input delay to forward sampler 136 is estimated, the arrival time of the timing signal 195 can be adjusted appropriately.

Figure 3:
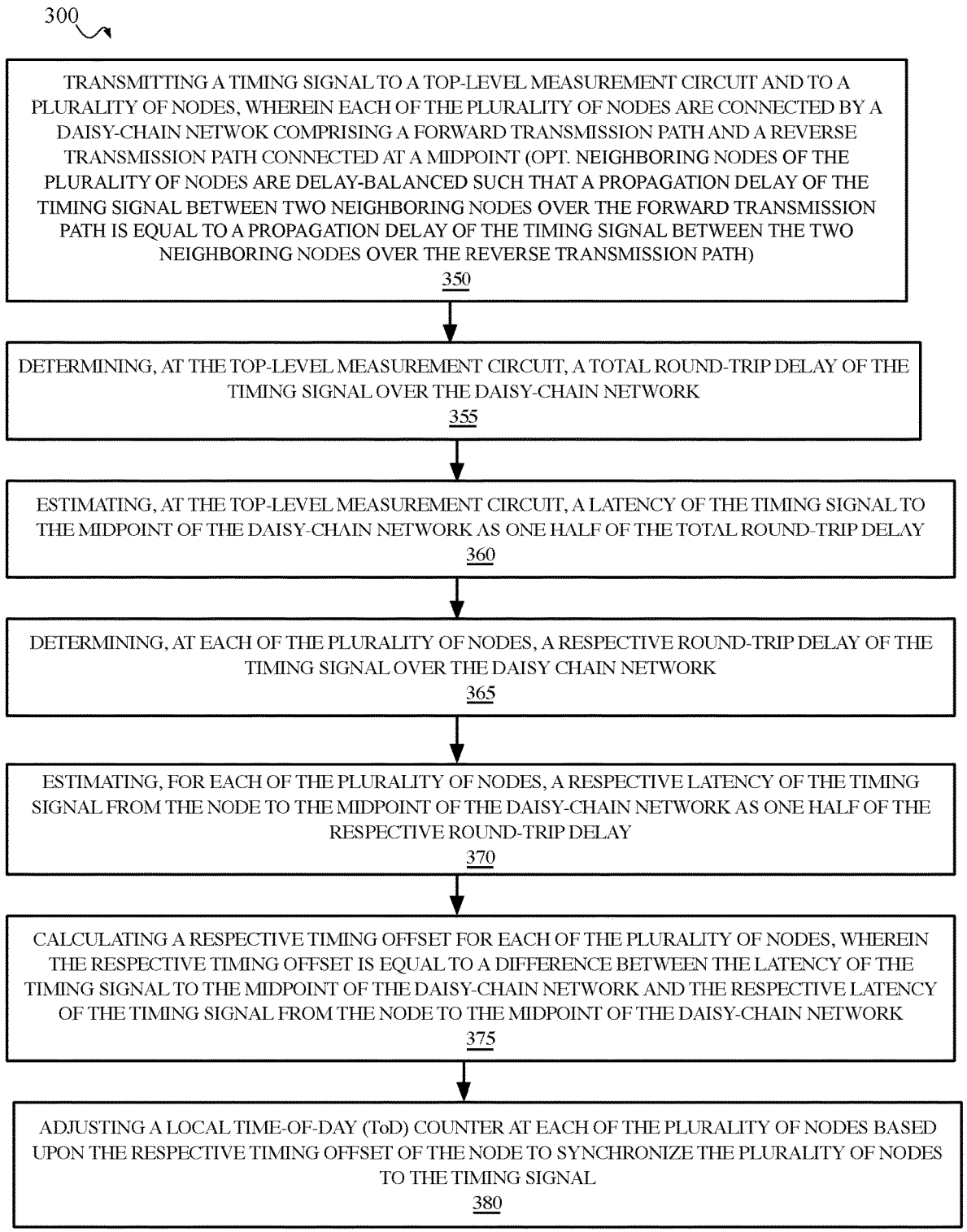
FIG. 3 is a flow diagram illustrating a method for synchronizing a plurality of nodes to a timing signal, in accordance with an embodiment of the present invention.

FIG. 3 is a flow diagram illustrating a method 300 for synchronizing a plurality of nodes to a timing signal, in accordance with an embodiment of the present invention.

At operation 350 of FIG. 3, the method 300 includes transmitting a timing signal to a plurality of nodes, wherein each of the plurality of nodes are connected by a daisy-chain network comprising a forward transmission path and a reverse transmission path connected at a midpoint. In a particular embodiment, the method includes delay-balancing neighboring nodes of the plurality of nodes such that a propagation delay of the timing signal between two neighboring nodes over the forward transmission path is equal to a propagation delay of the timing signal between the two neighboring nodes over the reverse transmission path. With reference to FIG. 1, a timing signal 195 is transmitted to a plurality of nodes 105, 110, 115, 120, 125, 135 over a daisy-chain network 190 comprising a forward transmission path 150 and a reverse transmission path 155 connected at a midpoint 275.

At operation 355, the method 300 continues by determining, at a top-level measurement circuit, a total round-trip delay of the timing signal over the daisy-chain network and at operation 360 by estimating a latency of the timing signal to the midpoint of the daisy-chain network as one half of the total round-trip delay. With reference to FIG. 2, a top-level measurement circuit 250 determines a total round-trip delay of the timing signal and estimates a latency of the timing signal 195 to the midpoint 275 of the daisy-chain network 190.

The method 300 continues at operation 365 by determining, at each of the plurality of nodes, a respective round-trip delay of the timing signal over the daisy-chain network and at operation 370 by estimating, for each of the plurality of nodes, a respective latency of the timing signal from the node to the midpoint of the daisy-chain network as one half of the respective round-trip delay. The method 300 then continues at operation 375 by calculating a respective timing offset for each of the plurality of nodes, wherein the respective timing offset is equal to a difference between the latency of the timing signal to the midpoint of the daisy-chain network and the respective latency of the timing signal from the node to the midpoint of the daisy-chain network. With reference to FIG. 2, each of the plurality of nodes 105, 110, 115, 120, 125, 130 determines a respective round-trip delay, estimates a respective latency of the timing signal 195 from the node to the midpoint 275 of the daisy-chain network 175 and each of the plurality of nodes 105, 110, 115, 120, 125 then calculates a respective timing offset, wherein the respective timing offset is equal to a difference between the latency of the timing signal 195 to the midpoint 275 of the daisy-chain network 190 as estimated by top-level measurement circuit 250 and the respective latency of the timing signal 195 from the node to the midpoint 275 of the daisy-chain network 190. In the embodiment illustrated in FIG. 1 and FIG. 2, each of the plurality of nodes 105, 110, 115, 120, 125 estimates a respective latency of the timing signal 195 from the node to the midpoint 275 of the daisy-chain network 175 using a respective measurement circuit 205, 210, 215, 220, 225, 230. In an alternative embodiment the respective measurement circuits 205, 210, 215, 220, 225, 230 may be replaced by a common measurement circuit that is responsible for estimating the respectively latency for each of the plurality of nodes 105, 110, 115, 120, 125 and then the estimates are provided by the common measurement circuit to each of the plurality of nodes 105, 110, 115, 120, 125.

The method 300 concludes at operation 380 by adjusting a local time-of-day (ToD) counter at each of the plurality of nodes based upon the respective timing offset of the node to synchronize the plurality of nodes to the timing signal. With reference to FIG. 1 each of the plurality of nodes 105, 110, 115, 120, 125, 130 adjusts their local ToD counter based upon the respective timing offset of the node to synchronize itself to the timing signal 195.

Figure 4:
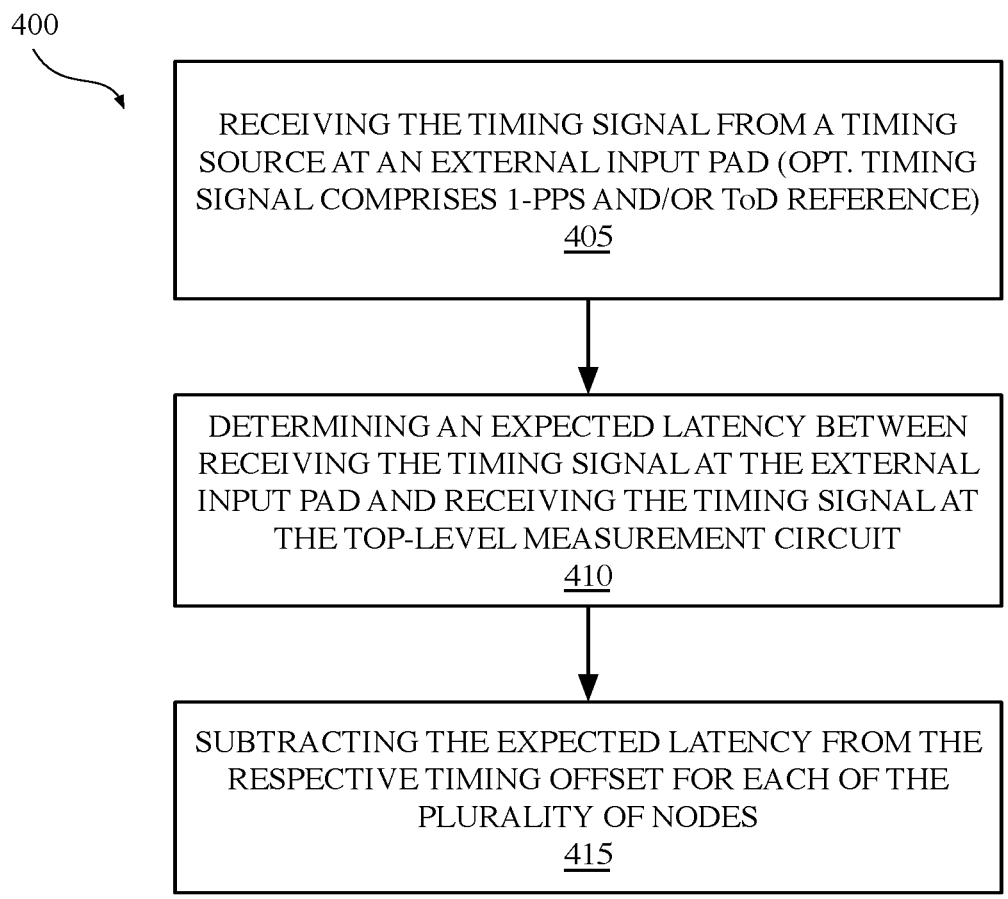
FIG. 4 is a flow diagram illustrating additional steps for performing synchronization to account for a timing delay from the source of the timing signal to the top-level measurement circuit, in accordance with an embodiment of the present invention.

FIG. 4 is a flow diagram illustrating additional steps 400 in the method of the present invention for performing synchronization 300 to account for a timing delay from the source of the timing signal to the top-level measurement circuit.

At operation 405 of FIG. 4, the method 400 includes receiving the timing signal from a timing source. With reference to FIG. 1, a timing source 260 provides the timing signal 195 at external input pad 160.

The method continues at operation 410 by determining an expected latency between receiving the timing signal at an external input pad and receiving the timing signal at the top-level measurement circuit and at operation 415 by subtracting the expected latency from the respective timing offset for each of the plurality of nodes. With reference to FIG. 1 and FIG. 2, a known expected latency 340 between receiving the timing signal 195 from the timing source 260 at the external input pad 160 and receiving the timing signal 195 at the top-level measurement circuit 250 may be determined and each of the plurality of nodes 105, 110, 115, 120, 125, 130 may then subtract this expected latency from their respective timing offset to synchronize with the timing signal 195.

Figure 5:
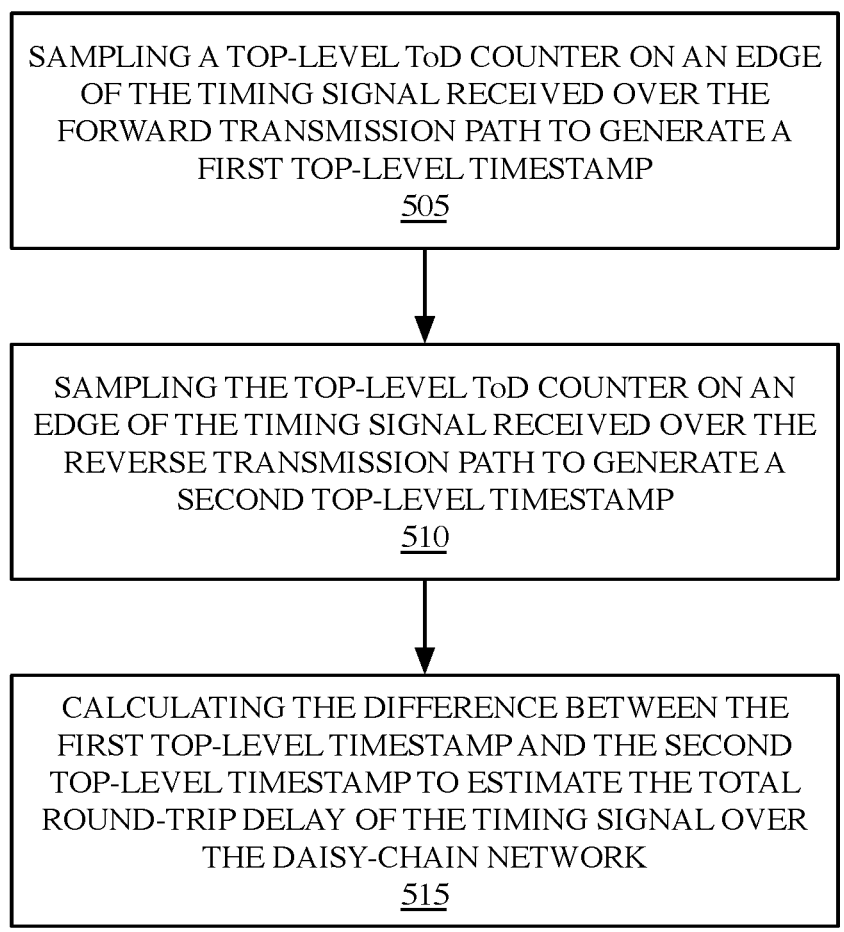
FIG. 5 is a flow diagram illustrating a method for determining the round-trip delay of the timing signal over the daisy-chain network, in accordance with an embodiment of the present invention.

FIG. 5 is a flow diagram illustrating a method 500 for determining the round-trip delay of the timing signal over the daisy-chain network.

At operation 505 of FIG. 5, the method 500 includes sampling a top-level ToD counter on an edge of the timing signal received over the forward transmission path to generate a first top-level timestamp and at operation 510 the method 500 includes sampling the top-level ToD counter on the edge of the timing signal received over the reverse transmission path to generate a second top-level timestamp. Either the rising edge, or the falling edge, of the timing signal may be used. With reference to FIG. 1, a forward sampler 136 of the top-level measurement circuit 250 samples the top-level counter 140 on an edge of the timing signal 195 received over the forward transmission path 150 to generate a first top-level timestamp and a reverse sampler 138 of the top-level measurement circuit 250 samples the top-level counter 140 on the edge of the timing signal 195 received over the reverse transmission path 155 to generate a second top-level timestamp.

The method 500 continues at operation 515 by calculating the difference between the first top-level timestamp and the second top-level timestamp to determine the total round-trip delay of the timing signal over the daisy-chain network. With reference to FIG. 1, the top-level measurement circuit 250 calculates the difference between the first top-level timestamp and the second top-level timestamp to determine the total round-trip delay of the timing signal 195 over the daisy-chain network 190.

Figure 6:
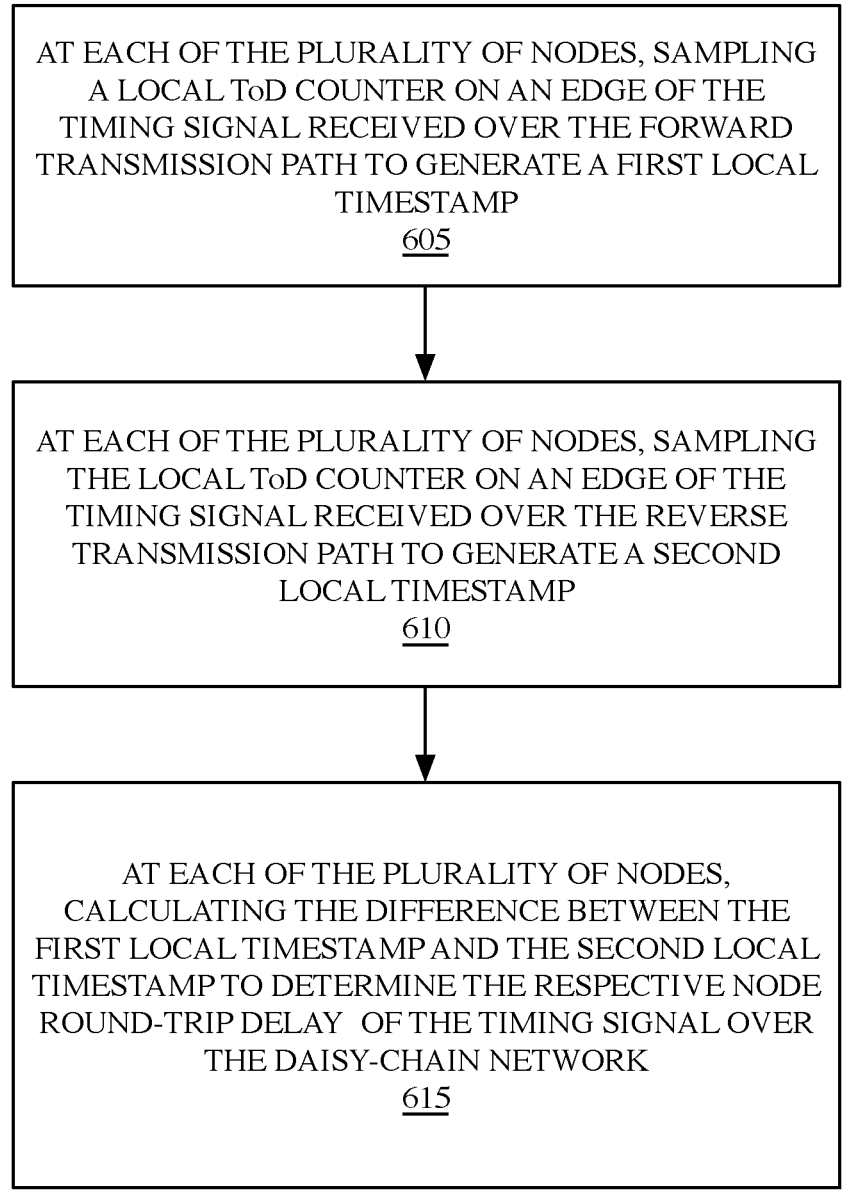
FIG. 6 is a flow diagram illustrating a method for determining the round-trip delay of the timing signal from each one of the plurality of nodes over the daisy-chain network, in accordance with an embodiment of the present invention.

FIG. 6 is a flow diagram illustrating a method 600 for determining, at each of the plurality of nodes, the respective round-trip delay of the timing signal over the daisy-chain network.

At operation 605 of FIG. 6, the method 600 includes sampling the local ToD counter on an edge of the timing signal received over the forward transmission path to generate a first local timestamp and at operation 610, the method 600 includes sampling the local ToD counter on the edge of the timing signal received over the reverse transmission path to generate a second local timestamp. Either the rising edge, or the falling edge, of the timing signal may be used. With reference to FIG. 1, a respective forward sampler 102, 112, 117, 122, 127, 132 of each of the plurality of nodes 105, 110, 115, 120, 125, 130 samples the respective ToD counter 106, 116, 121, 126, 131, 136 on an edge of the timing signal 195 received over the forward transmission path 150 to generate a first local timestamp and a respective reverse sampler 104, 114, 119, 124, 129, 134 of each of the plurality of nodes 105, 110, 115, 120, 125, 130 samples the respective ToD counter 106, 116, 121, 126, 131, 136 on the edge of the timing signal 195 received over the reverse transmission path 155 to generate a second local timestamp.

At operation 615, the method continues by calculating, at each of the plurality of nodes, the difference between the first local timestamp and the second local timestamp to determine the respective node round-trip delay of the timing signal over the daisy-chain network. With reference to FIG. 1, each of the plurality of nodes 105, 110, 115, 120, 125, 130 calculates the difference between the first local timestamp and the second local timestamp to determine a respective node round-trip delay of the timing signal 195 over daisy-chain network 190.

Experimental results show that the synchronization method in accordance with the present invention is capable of better than +/− 40 ps error, which is an order of magnitude smaller than a common sampling clock period, which is the dominant source of error. This is a significant improvement over previously known solutions that are only capable of +/− 160 ps error to a single endpoint and which are much more difficult and time consuming to implement. The previously known synchronization methods also require that the timing measurements be done externally, whereas the present approach may be internal to the node. The solution thus allows for a fully integrated synchronization via a firmware routine that is nearly seamless to the end user facilitating node integration, thereby reducing design effort and accelerating the development cycle.

In one embodiment, portions of the timing synchronization system may be implemented in an integrated circuit on a single semiconductor die. Alternatively, the integrated circuit may include multiple semiconductor die that are electrically coupled together such as, for example, a multi-chip module that is packaged in a single integrated circuit package.

In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, a network processor, a microcontroller or general-purpose computer.

Unless specifically stated otherwise as apparent from the discussion, it is appreciated that throughout the description, discussions utilizing terms such as "receiving", "determining", "generating", "limiting", "sending", "counting", "classifying", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention may be embodied on various computing platforms that perform actions responsive to software-based instructions. The following provides an antecedent basis for the information technology that may be utilized to enable the invention.

The method of the present invention may be stored on a computer readable medium which may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C #, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, processor, or other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further, for purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized, and that logical, mechanical, electrical, and other changes may be made without departing from the scope of the present invention.

What is claimed is:

1. A method for synchronizing a plurality of nodes to a timing signal, the method comprising:
   receiving the timing signal from a timing source at an external input pad;
   receiving the timing signal at a top-level measurement circuit;
   determining an expected latency between receiving the timing signal from the timing source at the external input pad and receiving the timing signal at the top-level measurement circuit;
   receiving the timing signal at a plurality of nodes, wherein respective ones of the plurality of nodes are connected by a daisy-chain network comprising a forward transmission path and a reverse transmission path connected at a midpoint;
   determining, at the top-level measurement circuit, a total round-trip delay of the timing signal over the daisy-chain network;
   estimating, at the top-level measurement circuit, a latency of the timing signal to the midpoint of the daisy-chain network as one half of the total round-trip delay;
   determining, at respective ones of the plurality of nodes, a respective round-trip delay of the timing signal over the daisy-chain network;
   estimating, for respective ones of the plurality of nodes, a respective latency of the timing signal from the node to the midpoint of the daisy-chain network as one half of the respective round-trip delay;
   calculating a respective timing offset for respective ones of the plurality of nodes, wherein the respective timing offset is equal to a difference between the latency of the timing signal to the midpoint of the daisy-chain network and the respective latency of the timing signal from the node to the midpoint of the daisy-chain network minus the expected latency between receiving the timing signal from the timing source at the external input pad and receiving the timing signal at the top-level measurement circuit; and
   adjusting a local time-of-day counter at respective ones of the plurality of nodes based upon the respective timing offset of the node-to synchronize the plurality of nodes to the timing signal.

2. The method of claim 1, further comprising delay-balancing neighboring nodes of the plurality of nodes, wherein neighboring nodes are delay-balanced when a propagation delay of the timing signal between two neighboring nodes over the forward transmission path is equal to a propagation delay of the timing signal between the two neighboring nodes over the reverse transmission path.

3. A method for synchronizing a plurality of nodes to a timing signal, the method comprising:
   receiving a timing signal at a top-level measurement circuit;
   receiving the timing signal at a plurality of nodes, wherein respective ones of the plurality of nodes are connected by a daisy-chain network comprising a forward transmission path and a reverse transmission path connected at a midpoint;
   determining, at the top-level measurement circuit, a total round-trip delay of the timing signal over the daisy-chain network by sampling a top-level time-of-day counter on an edge of the timing signal received over the forward transmission path to generate a first top-level timestamp, sampling the top-level time-of-day counter on the edge of the timing signal received over the reverse transmission path to generate a second top-level timestamp and calculating the difference between the first top-level timestamp and the second top-level timestamp to determine the total round-trip delay of the timing signal over the daisy-chain network;
   estimating, at the top-level measurement circuit, a latency of the timing signal to the midpoint of the daisy-chain network as one half of the total round-trip delay;
   determining, at respective ones of the plurality of nodes, a respective round-trip delay of the timing signal over the daisy-chain network;
   estimating, for respective ones of the plurality of nodes, a respective latency of the timing signal from the node to the midpoint of the daisy-chain network as one half of the respective round-trip delay;
   calculating a respective timing offset for respective ones of the plurality of nodes, wherein the respective timing offset is equal to a difference between the latency of the timing signal to the midpoint of the daisy-chain network and the respective latency of the timing signal from the node to the midpoint of the daisy-chain network; and adjusting a local time-of-day counter at respective ones of the plurality of nodes based upon the respective timing offset of the node to synchronize the plurality of nodes to the timing signal.

4. The method of claim 3, further comprising sampling the top-level time-of-day counter on the edge of the timing signal received over the forward transmission path with a forward sampler of the top-level measurement circuit and sampling the top-level time-of-day counter on the edge of the timing signal received over the reverse transmission path with a reverse sampler of the top-level measurement circuit.

5. A method for synchronizing a plurality of nodes to a timing signal, the method comprising:
receiving a timing signal at a top-level measurement circuit;
receiving the timing signal at a plurality of nodes, wherein respective ones of the plurality of nodes are connected by a daisy-chain network comprising a forward transmission path and a reverse transmission path connected at a midpoint;
determining, at the top-level measurement circuit, a total round-trip delay of the timing signal over the daisy-chain network;
estimating, at the top-level measurement circuit, a latency of the timing signal to the midpoint of the daisy-chain network as one half of the total round-trip delay;
determining, at respective ones of the plurality of nodes, a respective round-trip delay of the timing signal over the daisy-chain network by sampling the local time-of-day counter on an edge of the timing signal received over the forward transmission path to generate a first local timestamp, sampling the local time-of-day counter on the edge of the timing signal received over the reverse transmission path to generate a second local timestamp and calculating the difference between the first local timestamp and the second local timestamp to determine the respective node round-trip delay of the timing signal over the daisy-chain network;
estimating, for respective ones of the plurality of nodes, a respective latency of the timing signal from the node to the midpoint of the daisy-chain network as one half of the respective round-trip delay;
calculating a respective timing offset for respective ones of the plurality of nodes, wherein the respective timing offset is equal to a difference between the latency of the timing signal to the midpoint of the daisy-chain network and the respective latency of the timing signal from the node to the midpoint of the daisy-chain network; and
adjusting a local time-of-day counter at respective ones of the plurality of nodes based upon the respective timing offset of the node to synchronize the plurality of nodes to the timing signal.

6. The method of claim 5, further comprising sampling the local time-of-day counter on the edge of the timing signal received over the forward transmission path with a forward sampler of the respective node and sampling the local time-of-day counter on the edge of the timing signal received over the reverse transmission path with a reverse sampler of the respective node.

7. The method of claim 5, wherein the timing signal comprises a pulse-per-second (PPS) signal.

8. The method of claim 5, wherein the timing signal comprises a time-of-day reference.

9. The method of claim 1, wherein the timing source is a primary reference time clock.

10. A method for synchronizing a plurality of nodes to a timing signal, the method comprising:
receiving a timing signal from a timing source at an external input pad;
transmitting the timing signal from the external input pad to a top-level measurement circuit;
transmitting the timing signal from the external input pad to a plurality of nodes, wherein respective ones of the plurality of nodes are connected by a daisy-chain network comprising a forward transmission path and a reverse transmission path connected at a midpoint and wherein neighboring nodes of the plurality of nodes are delay-balanced such that a propagation delay of the timing signal between two neighboring nodes over the forward transmission path is equal to a propagation delay of the timing signal between the two neighboring nodes over the reverse transmission path;
receiving the transmitted timing signal at the top-level measurement circuit;
receiving the transmitted timing signal at the plurality of nodes;
determining, at the top-level measurement circuit, a total round-trip delay of the timing signal over the daisy-chain network;
estimating, at the top-level measurement circuit, a latency of the timing signal to the midpoint of the daisy-chain network as one half of the total round-trip delay;
determining, at respective ones of the plurality of nodes, a respective round-trip delay of the timing signal over the daisy-chain network;
estimating, for respective ones of the plurality of nodes, a respective latency of the timing signal from the node to the midpoint of the daisy-chain network as one half of the respective round-trip delay;
determining an expected latency between receiving the timing signal at the external input pad and receiving the timing signal at the top-level measurement circuit;
calculating a respective timing offset for respective ones of the plurality of nodes, wherein the respective timing offset is equal to a difference between the latency of the timing signal to the midpoint of the daisy-chain network and the respective latency of the timing signal from the node to the midpoint of the daisy-chain network, minus the expected latency between receiving the timing signal at the external input pad and transmitting the timing signal to the top-level measurement circuit; and
adjusting a local time-of-day counter at respective ones of the plurality of nodes based upon the respective timing offset of the node to synchronize the plurality of nodes to the timing signal.

11. A system for synchronizing a plurality of nodes to a timing signal, the system comprising:
a plurality of nodes, respective ones of the plurality of node comprising a respective measurement circuit;
a daisy-chain network respective ones of the plurality of nodes, the daisy-chain network comprising a forward transmission path and a reverse transmission path connected at a midpoint;
a top-level measurement circuit to receive a timing signal transmitted over the forward transmission path, to receive the timing signal over the reverse transmission path of the daisy-chain network, to determine to a total round-trip delay of the timing signal over the daisy-chain network and to estimate a latency of the timing signal from the top-level measurement circuit to the midpoint of the daisy-chain network as one half of the total round-trip delay;

the respective measurement circuit at respective ones of the plurality of nodes to:
- receive the timing signal transmitted over the forward transmission path and receive the timing signal transmitted over the reverse transmission path of the daisy-chain network;
- determine a respective round-trip delay of the timing signal over the daisy-chain network;
- estimate a respective latency of the timing signal from the node to the midpoint of the daisy-chain network as one half of the respective round-trip delay;
- calculate a respective timing offset for respective ones of the plurality of nodes, wherein the respective timing offset is equal to a difference between the estimated latency of the timing signal from the top-level measurement circuit to the midpoint of the daisy-chain network and the respective estimated latency of the timing signal from the node to the midpoint of the daisy-chain network minus an expected latency between receive the timing signal from a timing source at an external input pad and receive the timing signal at the top-level measurement circuit; and
- adjust a local time-of-day counter at respective ones of the plurality of nodes based upon the respective calculated timing offset of the node to synchronize the plurality of nodes to the timing signal.

12. The system of claim 11, comprising the timing source to provide the timing signal to the top-level measurement circuit and to the plurality of endpoints over the daisy-chain network.

13. The system of claim 12, wherein the timing source is a primary reference time clock.

14. The system of claim 11, wherein neighboring nodes of the plurality of nodes are delay-balanced such that a propagation delay of the timing signal between two neighboring nodes over the forward transmission path is equal to a propagation delay of the timing signal between the two neighboring nodes over the reverse transmission path.

15. A system for synchronizing a plurality of nodes to a timing signal, the system comprising:
- a plurality of nodes, respective ones of the plurality of node comprising a respective measurement circuit;
- a daisy-chain network connecting respective ones of the plurality of nodes, the daisy-chain network comprising a forward transmission path and a reverse transmission path connected at a midpoint;
- a top-level measurement circuit to receive a timing signal transmitted over the forward transmission path, to receive the timing signal over the reverse transmission path of the daisy-chain network, to sample a top-level time-of-day counter on an edge of the timing signal received over the forward transmission path to generate a first top-level timestamp, to sample the top-level time-of-day counter on the edge of the timing signal received over the reverse transmission path to generate a second top-level timestamp to calculate the difference between the first top-level timestamp and the second top-level timestamp to determine the total round-trip delay of the timing signal over the daisy-chain network and to estimate a latency of the timing signal from the top-level measurement circuit to the midpoint of the daisy-chain network as one half of the total round-trip delay;

the respective measurement circuit at respective ones of the plurality of nodes to:
- receive the timing signal transmitted over the forward transmission path and receive the timing signal transmitted over the reverse transmission path of the daisy-chain network;
- determine a respective round-trip delay of the timing signal over the daisy-chain network;
- estimate a respective latency of the timing signal from the node to the midpoint of the daisy-chain network as one half of the respective round-trip delay;
- calculate a respective timing offset for respective ones of the plurality of nodes, wherein the respective timing offset is equal to a difference between the estimated latency of the timing signal from the top-level measurement circuit to the midpoint of the daisy-chain network and the respective estimated latency of the timing signal from the node to the midpoint of the daisy-chain network; and
- adjust a local time-of-day counter at respective ones of the plurality of nodes based upon the respective calculated timing offset of the node to synchronize the plurality of nodes to the timing signal.

16. The system of claim 15, wherein the top-level measurement circuit comprises a forward sampler sample the top-level time-of-day counter on the edge of the timing signal received over the forward transmission path and a reverse sampler to sample the top-level time-of-day counter on the edge of the timing signal received over the reverse transmission path.

17. A system for synchronizing a plurality of nodes to a timing signal, the system comprising:
- a plurality of nodes, respective ones of the plurality of node comprising a respective measurement circuit;
- a daisy-chain network connecting respective ones of the plurality of nodes, the daisy-chain network comprising a forward transmission path and a reverse transmission path connected at a midpoint;
- a top-level measurement circuit to receive a timing signal transmitted over the forward transmission path, to receive the timing signal over the reverse transmission path of the daisy-chain network, to determine a total round-trip delay of the timing signal over the daisy-chain network and to estimate a latency of the timing signal from the top-level measurement circuit to the midpoint of the daisy-chain network as one half of the total round-trip delay;
- the respective measurement circuit at respective ones of the plurality of nodes to:
  - receive the timing signal transmitted over the forward transmission path and receive the timing signal transmitted over the reverse transmission path of the daisy-chain network;
  - determine a respective round-trip delay of the timing signal over the daisy-chain network by sampling the local time-of-day counter on an edge of the timing signal received over the forward transmission path to generate a first local timestamp, sampling the local time-of-day counter on the edge of the timing signal received over the reverse transmission path to generate a second local timestamp and calculating the difference between the first local timestamp and the second local timestamp to determine the respective node round-trip delay of the timing signal over the daisy-chain network;

estimate a respective latency of the timing signal from the node to the midpoint of the daisy-chain network as one half of the respective round-trip delay;

calculate a respective timing offset for respective ones of the plurality of nodes, wherein the respective timing offset is equal to a difference between the estimated latency of the timing signal from the top-level measurement circuit to the midpoint of the daisy-chain network and the respective estimated latency of the timing signal from the node to the midpoint of the daisy-chain network; and adjust a local time-of-day counter at respective ones of the plurality of nodes based upon the respective calculated timing offset of the node to synchronize the plurality of nodes to the timing signal.

18. The system of claim 17, wherein respective ones of the plurality of nodes comprises a forward sampler to sample the local time-of-day counter on the edge of the timing signal received over the forward transmission path and a reverse sampler to sample the local time-of-day counter on the edge of the timing signal received over the reverse transmission path.

* * * * *

UNITED STATES PATENT AND TRADEMARK OFFICE
CERTIFICATE OF CORRECTION

PATENT NO. : 11,424,902 B2
APPLICATION NO. : 17/242493
DATED : August 23, 2022
INVENTOR(S) : Atanu Chattopadhyay and Andras de Koos It is certified that error appears in the above-identified patent and that said Letters Patent is hereby corrected as shown below:

In the Claims

In Column 18, Line 65, "to determine to a" should read --to determine a--.

In Column 19, Line 23, "receive" should read --receiving--.

In Column 19, Line 25, "receive" should read --receiving--.

In Column 20, Line 26, "sampler sample" should read --sampler to sample--.

Signed and Sealed this
Eighth Day of November, 2022

Katherine Kelly Vidal
*Director of the United States Patent and Trademark Office*